(12) United States Patent  
Nilsson et al.

(10) Patent No.: US 9,112,551 B2  
(45) Date of Patent: Aug. 18, 2015

(54) ANTENNA ARCHITECTURE FOR MAINTAINING BEAM SHAPE IN A RECONFIGURABLE ANTENNA

(75) Inventors: Andreas Nilsson, Gothenburg (SE); Patrik Persson, Grabo (SE); Sven Petersson, Savedalen (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 17 days.

(21) Appl. No.: 13/885,653

(22) PCT Filed: Nov. 15, 2010

(86) PCT No.: PCT/EP2010/067488  
§ 371 (c)(1),  
(2), (4) Date: May 15, 2013

(87) PCT Pub. No.: WO2012/065622  
PCT Pub. Date: May 24, 2012

(65) Prior Publication Data  
US 2013/0235806 A1     Sep. 12, 2013

(51) Int. Cl.  
*H04B 7/04* (2006.01)  
*H04B 1/00* (2006.01)  
*H04Q 3/30* (2006.01)  
*H04Q 3/22* (2006.01)  
(Continued)

(52) U.S. Cl.  
CPC ............. *H04B 7/0408* (2013.01); *H01Q 1/246* (2013.01); *H01Q 3/22* (2013.01); *H01Q 3/30* (2013.01); *H01Q 5/50* (2015.01); *H01Q 21/22* (2013.01); *H04B 1/005* (2013.01); *H04B 1/006* (2013.01); *H04B 1/0057* (2013.01); *H04B 1/0067* (2013.01)

(58) Field of Classification Search  
None  
See application file for complete search history.

(56) References Cited

U.S. PATENT DOCUMENTS 3,518,695 A     6/1970   Schroeder  
5,748,683 A *   5/1998   Smith et al. .................... 375/347  
(Continued)

FOREIGN PATENT DOCUMENTS

CN     1768449 A     5/2006  
WO     0207254 A1    1/2002  
(Continued)

OTHER PUBLICATIONS

Author Unknown, Linear Circuit Design Handbook, Chapter 4: RF/IF Circuits, pp. 4.1-4.72, Mar. 13, 2008.*

(Continued)

*Primary Examiner* — Christopher Crutchfield  
(74) *Attorney, Agent, or Firm* — Rothwell, Figg, Ernst & Manbeck, P.C.

(57) ABSTRACT

A node in a wireless communication system comprising an antenna array with at least a first antenna function and a second antenna function. The node further comprises a first radio chain and a second radio chain, where each antenna function is connected to a base band via a corresponding radio chain. Each radio chain comprises an oscillator, a splitter and a multiplexer, each oscillator being arranged to feed a signal with a unique frequency band to the splitter in the same radio chain. The splitter is arranged to divide the signal into at least two signal parts and feed each part to the multiplexer of each radio chain such that each multiplexer in the node receives signal parts from each splitter in the node. The splitter is arranged to weight the division of the signal into the signal parts in dependence of the frequency bands fed by each oscillator.

6 Claims, 5 Drawing Sheets

(51) Int. Cl.
*H01Q 1/24* (2006.01)
*H01Q 3/30* (2006.01)
*H01Q 21/22* (2006.01)
*H01Q 3/22* (2006.01)
*H01Q 5/50* (2015.01)

(56) References Cited

U.S. PATENT DOCUMENTS

| | | | | |
|---|---|---|---|---|
| 5,854,986 | A * | 12/1998 | Dorren et al. | 455/562.1 |
| 6,087,986 | A | 7/2000 | Shoki et al. | |
| 6,405,018 | B1 * | 6/2002 | Reudink et al. | 455/20 |
| 2004/0022787 | A1 * | 2/2004 | Cohen et al. | 424/144.1 |
| 2004/0166901 | A1 * | 8/2004 | Umesh et al. | 455/561 |
| 2006/0019710 | A1 * | 1/2006 | Ylitalo | 455/562.1 |
| 2006/0120477 | A1 * | 6/2006 | Shen et al. | 375/267 |
| 2010/0260076 | A1 * | 10/2010 | Corman et al. | 370/277 |
| 2010/0261440 | A1 * | 10/2010 | Corman et al. | 455/91 |

FOREIGN PATENT DOCUMENTS

| | | |
|---|---|---|
| WO | 2004088794 A1 | 10/2004 |
| WO | 2005062426 A1 | 7/2005 |

OTHER PUBLICATIONS

Aminghasem Safarian, Lei Zhou, and Payam Heydari, CMOS Distributed Active Power Combiners and Splitters for Multi-Antenna UWB Beamforming Transceivers, IEEE Journal of Solid-State Circuits, vol. 42, pp. 1481-1491.*

English translation of First Office Action and Search Report issued on Jun. 4, 2014, in Chinese application 201080070163.7, 12 pages.

Zhang, F., "Performance Comparison of Fixed Weight and Time-Varying Weight Frequency Agile Chancellor," Modem Radar, No. 4, Dec. 31, 1991, Abstract only, 2 pages.

Decision on Rejection dated Jan. 6, 2015, in connection with Chinese Patent Application No. 201080070163.7, 15 pages.

* cited by examiner

700 MHz: Array tapering 1, 1, 1

1000 MHz: Array tapering 1, 1, 1

700 MHz: Array tapering 1, 1, 1

1000 MHz: Array tapering 0.28, 1, 0.28

Beampoint 10deg

700 MHz: Array tapering 1, 1, 1

1000 MHz: Array tapering 1, 1, 1

Beampoint 10deg

700 MHz: Array tapering 1, 1, 1

1000 MHz: Array tapering 0.28, 1, 0.28

ANTENNA ARCHITECTURE FOR MAINTAINING BEAM SHAPE IN A RECONFIGURABLE ANTENNA

CROSS REFERENCE TO RELATED APPLICATION(S)

This application is a 35 U.S.C. §371 National Phase Entry Application from PCT/EP2010/067488, filed Nov. 15, 2010, designating the United States, the disclosure of which is incorporated herein in its entirety by reference.

TECHNICAL FIELD

The present invention relates to a node in a wireless communication system, the node comprising an antenna array with at least a first antenna function and a second antenna function. The node further comprises a first radio chain and a second radio chain, where each antenna function is connected to a base band via a corresponding radio chain. The present invention also relates to a method in the wireless communication system.

BACKGROUND

The use of mobile phones and wireless broadband devices has increased rapidly during the last decade, and it is expected to grow even faster during coming years. To meet these demands, operators must increase the capacity in their communication systems.

In LTE (Long Term Evolution) Advanced, wider bandwidth is achieved by aggregating component carriers either contiguously or non-contiguously. The component carriers are backward compatible with the ones defined in LTE Rel-8. For contiguous carrier aggregation, consecutive spectrum is aggregated. On the other hand, discontinuous bands are accumulated for non-contiguous carrier aggregation.

One way increase capacity in LTE-Advanced is to use reconfigurable antennas at the base station. A reconfigurable antenna is an antenna that can change its properties, for example change tilt, beam direction etc. This could be used to focus the power towards hotspot areas or balancing the load between different cells. To steer the beam in different directions, phase shifters are normally used.

The capacity may also be increased by increasing the frequency bandwidth. However, the available frequency spectrum is limited and to be able to get sufficient large bandwidth, an aggregation of fragmented frequency bands are needed. Two or more bandwidths are then used in combination to increase the bandwidth.

Reconfigurable antennas usually depicts of several antenna elements with individual phase shifters used to steer the beam of the antenna. Each frequency results in a beam. However, the different frequency bands will result in a spatial separation between antenna elements in terms of wavelength. This will cause the beam width to be different for different frequencies. When using aggregated spectrum, this means that different frequency bands will have different beam width, and therefore, also different coverage areas.

SUMMARY

The object of the present invention is therefore to maintain a certain beam width for different frequency bands in a reconfigurable antenna.

Said object is achieved by means of a node in a wireless communication system. The node comprises an antenna array with at least a first antenna function and a second antenna function. The node further comprises a first radio chain and a second radio chain, where each antenna function is connected to a base band via a corresponding radio chain. Each radio chain comprises an oscillator, a splitter and a multiplexer, where each oscillator is arranged to feed a signal with a unique frequency band to the splitter in the same radio chain. The splitter is arranged to divide the signal into at least two signal parts and feed each part to the multiplexer of each radio chain such that each multiplexer in the node receives signal parts from each splitter in the node.

The node is particularly characterized in that the splitter is arranged to weight the division of the signal into the signal parts in dependence of the frequency bands fed by each oscillator in the node.

Said object is also achieved by means of a method in the node in the wireless communication system, the node comprising at least two radio chains connected to a corresponding antenna array with antenna functions, each chain comprising an oscillator, a splitter and a multiplexer. The method comprises the steps of:
the oscillator feeding a signal with a unique frequency band to a splitter in the same radio chain,
the splitter dividing the signal into at least two signal parts,
the splitter feeding each part to a multiplexer of each radio chain such that each multiplexer in the node receives signal parts from each splitter in the node, The method is particularly characterized in that it comprises the step of:
the splitter weighting the division of the signal into the signal parts in dependence of the frequency bands fed by each oscillator in the node.

The main advantage with the invention is an architecture making it possible to get the same coverage area for different fragmented bands when using a reconfigurable antenna. This is done using a simple architecture with fixed amplitude tapers for each splitter. Further advantages will emerge from the detailed description.

BRIEF DESCRIPTION OF THE DRAWINGS

The present invention will now be described more in detail with reference to the appended drawings, where.

DETAILED DESCRIPTION

Figure 1A:
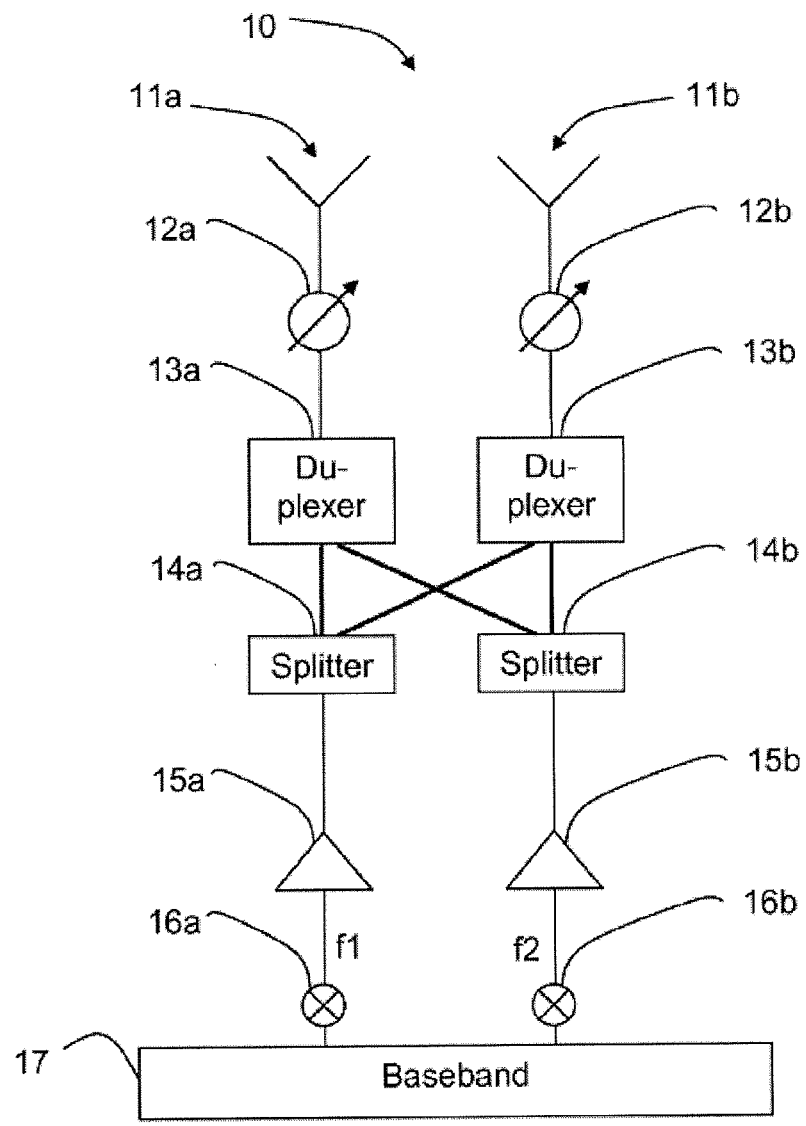
FIG. 1A schematically shows an example of a node according to the present invention.

FIG. 1A schematically shows an example of a node 10 according to the present invention. In the following, a node embodiment will be described. Said node comprises means arranged to perform certain procedures or method step. It should therefore be understood by a person skilled in the art that the embodiment also illustrates a method in the node for performing these procedures.

Figure 1B:
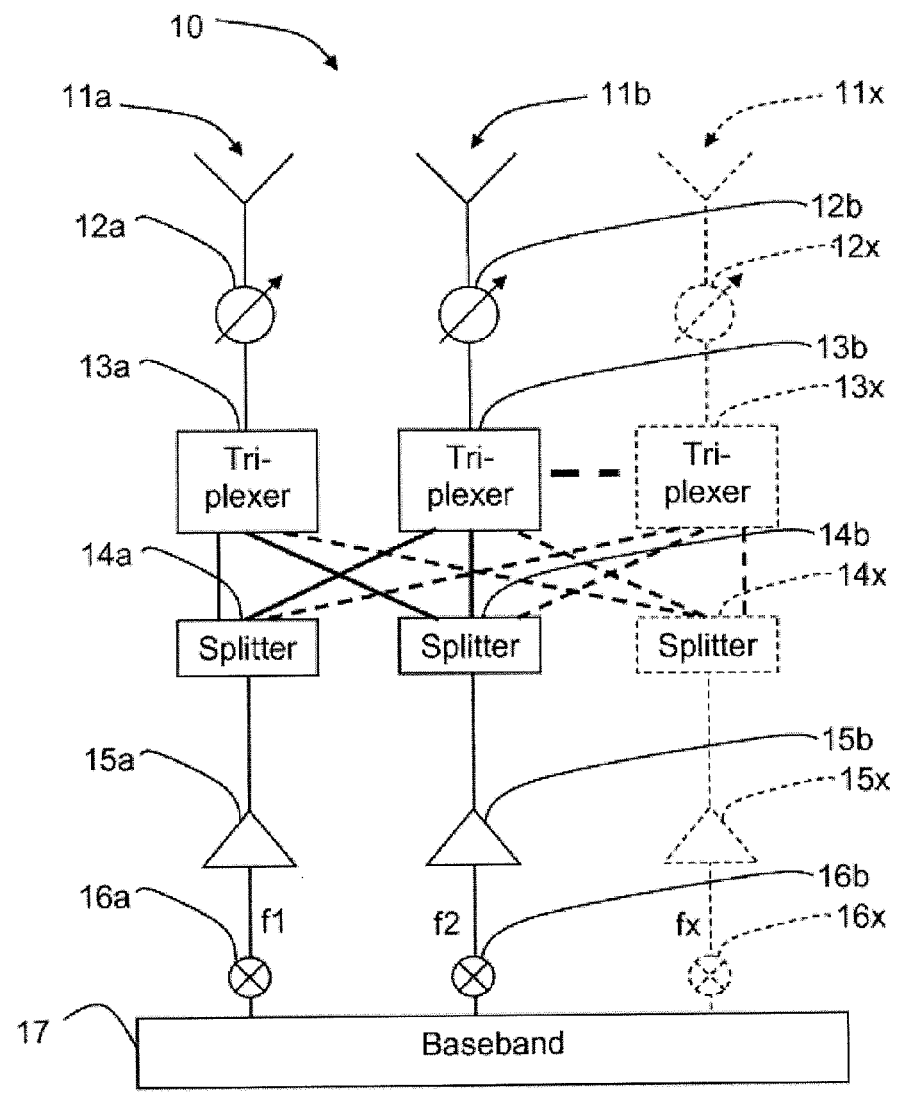
FIG. 1B schematically shows another example of a node according to the present invention.

The node comprises an antenna array with at least a first antenna function 11a and a second antenna function 11b. The node further comprises a first radio chain 12a-16a and a second radio chain 12b-16b. The node may comprise more than two antenna functions and radio chains, illustrated in FIG. 1B by a further antenna function 11x and a further radio chain 12x-16x. In the following, an example with two antenna functions and radio chains will be described. The invention is however not limited to a particular number of radio antenna functions and radio chains.

Each antenna function 11a,b is connected to a base band 17 via a corresponding radio chain 12a,b-16a,b. Each radio chain comprises an oscillator 16a,b, a splitter 14a,b and a duplexer 13a,b, where each oscillator is arranged to feed a signal with a unique frequency band f1, f2, fx to the splitter in the same radio chain. This means that the oscillator in each chain generates a signal in said chain within a certain frequency band, such as 700 or 1000 MHz. The oscillators generate signals on different frequency bands where each signal is amplified by respective power amplifier 15a,b.

A person skilled in the art will realize that in a node with more than two antenna functions and radio chains, the duplexer will be replaced by a triplexer or any other multiplexer depending on the number of signal parts receiver from different splitters. In the same way, the splitters will be capable of splitting the signals into more than two signal parts.

The splitter 14a,b is arranged to divide the signal into two signal parts and feed each part to the duplexer 13a,b of each radio chain 12a,b-16a,b such that each duplexer in the node 10 receives signal parts from each splitter in the node. In known radio chain solutions, the splitter divides the signal in the respective chain evenly into two parts, each part with ½ of the power of the divided signal. The splitter weight is therefore 1,1.

The duplexer 13a,b in each radio chain 12a,b-16a,b is arranged to combine the received signals from each frequency band f1, f2, f3, received from the different radio chains, and feed it towards the antenna function 11a,b in the same radio chain. Thereby, signals with different frequencies are combined in the same antenna element, which result in that the antenna array forms beams for each frequency band.

The antenna array consists in a reconfigurable antenna and the node 10 is arranged to change the beam characteristics. In order be able to change the beam characteristics, each radio chain 12a,b-16a,b comprises a phase shifter 12a,b. The shifters are controlled by digital beam forming and are used to create "one beam" with a particular beam width and direction for each particular frequency band. In order to be able to do so, the shifters need to consider the distance between the antenna functions. With the phase shifters, the node can change the beam characteristics (tilt, beam direction etc.) of the beams of each frequency band. This could be used to focus the power towards hotspot areas or balancing the load between different cells.

The node in FIG. 1A depicts of two antenna elements 11a,b, forming the antenna array. The node comprises individual phase shifters 14a,b used to change the beam characteristics. The different frequency bands will however result in a spatial separation between antenna elements in terms of wavelength. This will cause the beam width to be different for different frequencies. When using aggregated spectrum, this means that different frequency bands will have different beam width, and therefore also different coverage areas.

Figure 2:
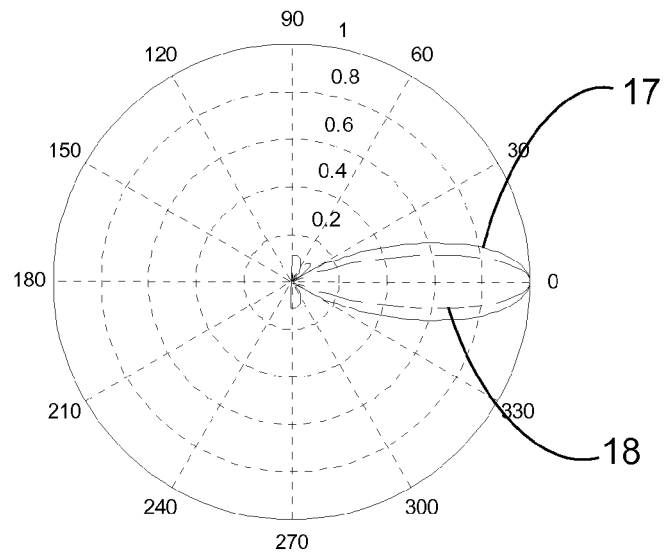
FIG. 2 shows a normalized horizontal radiation pattern for 700 MHz and 1000 MHz bands for a known reconfigurable antenna.
Figure 4:
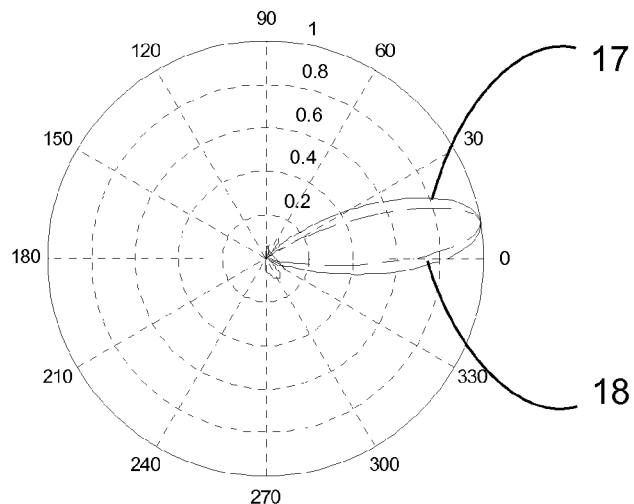
FIG. 4 shows a normalized horizontal radiation pattern for 700 MHz and 1000 MHz bands for a known reconfigurable antenna, the beams being directed 10° from broadside.

The different beam widths are shown in FIGS. 2 and 4. FIG. 2 shows the normalized horizontal radiation pattern for two different bands for a reconfigurable antenna with three antenna elements with spacing λ/2 at the frequency 700 MHz. FIG. 4 shows the same normalized horizontal radiation pattern for 700 MHz and 1000 MHz bands for a known reconfigurable antenna, the beams however being directed 10° from broadside. In these figures two beams are shown, which are the beam 17 for 700 MHz and the beam 18 for 1000 MHz bands. As illustrated by FIGS. 2 and 4, the beam 17 is wider than the beam 18, which means that the 700 MHz band has larger coverage than the 1000 MHz band.

In order to solve the problem with different beam widths, the splitter 14a,b in accordance with the present invention is arranged to weight the division of the signal into the signal parts in dependence of the frequency bands fed by each oscillator 16a,b in the node 10. The advantage with this solution is an architecture which makes it possible to get the same coverage area for different fragmented bands when using a reconfigurable antenna.

According to the present invention, each splitter 14a,b may have a fixed weight for the division. In order to achieve this, the node 10 comprises fixed amplitude tapers for each splitter. The array tapering is consequently fixed with widths balanced in dependency of the frequency bands present in the node. This means that for example in a node with three frequency bands, splitter 14a may have fixed amplitudes of 1, 1, 1 and the splitter 14b may have fixed amplitudes of 0.28, 1, and 0.28. This means that splitter 14a will divide the 700 MHz signal equally into three parts while the splitter 14b will divide the 1000 MHz signal unequal into three different parts. These parts are fed to the duplexers of respective radio chain.

Figure 3:
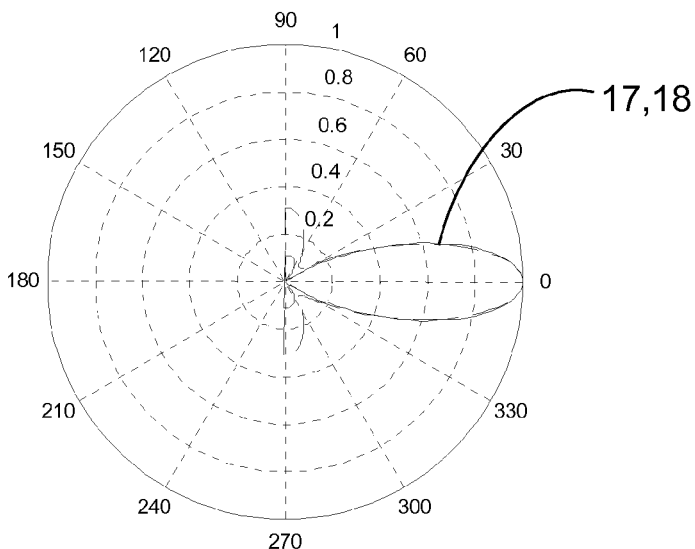
FIG. 3 shows a normalized horizontal radiation pattern for 700 MHz and 1000 MHz bands for a reconfigurable antenna according to the present invention.
Figure 5:
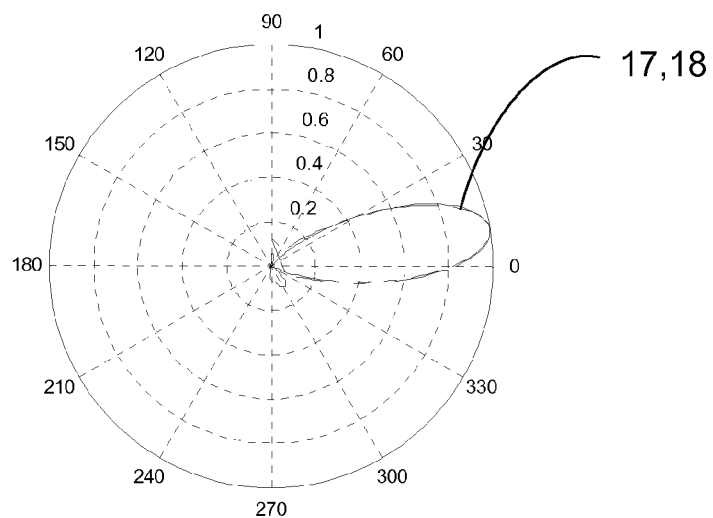
FIG. 5 shows a normalized horizontal radiation pattern for 700 MHz and 1000 MHz bands for a reconfigurable antenna according to the present invention, the beams being directed 10° from broadside.

The result of this solution is shown in FIGS. 3 and 5 where the beams 17 and 18 have the same size. As shown, when the division of the signals is weighted in dependency of the frequency bands, it will have the effect that the widths of the beams are changed. An advantage with this solution is that there is no need of using variable phase shifters, switches and control signalling to achieve an adaptation of the beam width.

The principle with weighted splitters 14a,b can be used both when changing the characteristics of an antenna pattern in azimuth dimension or in elevation dimension. This means that the antenna pattern for instance can be tilted, steered or changed is width. The antenna pattern illustrates radiation properties associated to a certain port (antenna port) in the architecture.

The number of antenna elements in the antenna array does not matter. FIG. 1A however shows a multiband antenna with one port per frequency band. As an alternative, a plurality of the nodes 10 according to the present invention may be arranged to be used for Multiple Input Multiple Output, MIMO. Moreover the node 10 may adapted for uplink and/or downlink communication.

Figure 6:
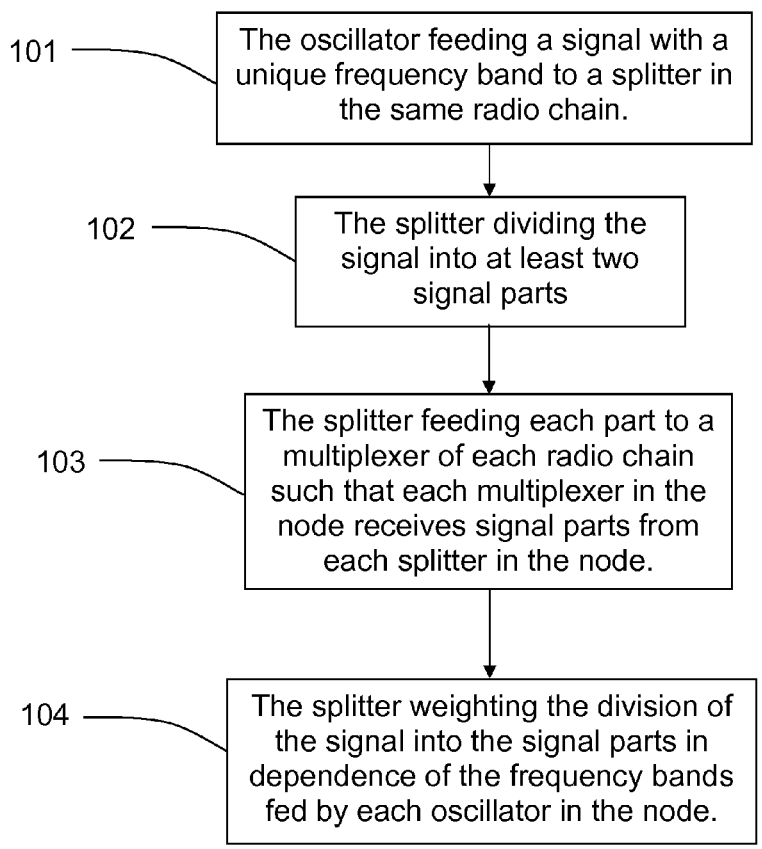
FIG. 6 shows a flow chart of a method according to the present invention.

With reference to FIG. 6, the present invention also refers to a method in the wireless communication system, the method comprises the steps of:

1. The oscillator feeding (101) a signal with a unique frequency band f1, f2, fx to the splitter 14a,b in the same radio chain 12a,b-16a,b,
2. The splitter dividing (102) the signal into at least two signal parts,
3. The splitter feeding (103) each part to a multiplexer 13a,b of each radio chain such that each multiplexer in the node 10 receives signal parts from each splitter in the node.

4. The splitter weighting (104) the division of the signal into the signal parts in dependence of the frequency bands fed by each oscillator in the node.

The present invention is not limited to the examples above, but may vary freely within the scope of the claims. For instance, the node may comprise a variety of antenna functions and radio chains. Furthermore, a number of nodes may be combined into a MIMO antenna. Moreover, alternative splitter solution may be introduced within the scope of the claims as long as they provide the needed functionality of weighting the signal in dependency of the frequency bands available.

The invention claimed is:

1. A node in a wireless communication system, the node comprising an antenna array with at least a first antenna function and a second antenna function, the node further comprising a first radio chain and a second radio chain, where each antenna function is connected to a base band via a corresponding radio chain, each radio chain comprising an oscillator, a splitter and a multiplexer, each oscillator being arranged to feed a signal with a unique frequency band to the splitter in the same radio chain, the splitter being arranged to divide the signal into at least two signal parts and feed each part to the multiplexer of each radio chain such that each multiplexer in the node receives signal parts from each splitter in the node, wherein the splitter being arranged to weight the division of the signal into the signal parts in dependence of the frequency bands fed by each oscillator in the node, wherein each splitter has a fixed weight for the division and wherein the node comprises fixed amplitude tapers for each splitter.

2. The node according to claim 1, wherein the node is adapted for changing the characteristics of an antenna pattern in azimuth dimension.

3. The node according to claim 1, wherein the node is adapted for changing the characteristics of an antenna pattern in elevation dimension.

4. The node according to claim 1, wherein the node is adapted for uplink and/or downlink communication.

5. The node according to claim 1, wherein a plurality of nodes are arranged in Multiple Input Multiple Output, MIMO.

6. A method in a node in a wireless communication system, the node comprising at least two radio chains connected to a corresponding antenna array with antenna functions, each chain comprising an oscillator, a splitter and a multiplexer, the method comprising the steps of:

the oscillator feeding a signal with a unique frequency band to a splitter in the same radio chain, the splitter dividing the signal into at least two signal parts, the splitter feeding each part to a multiplexer of each radio chain such that each multiplexer in the node receives signal parts from each splitter in the node, the splitter weighting the division of the signal into the signal parts in dependence of the frequency bands fed by each oscillator in the node, wherein each splitter has a fixed weight for the division and the node comprises fixed amplitude tapers for each splitter.

* * * * *